United States Patent

Wielinga

[15] 3,652,311

[45] Mar. 28, 1972

[54] PROCESS OF MANUFACTURING STRUCTURAL ELEMENTS

[72] Inventor: Pieter Simon Wielinga, Vuren Aan Der Waal, Netherlands

[73] Assignees: Fabriek van Bouwmaterialen "Loevestein" N.V., Vuren Aan Der Waal, Netherlands; Rheinisch-Westfalische Kalkwerke Aktiengesellschaft, Dorngh, Germany

[22] Filed: Dec. 22, 1969

[21] Appl. No.: 887,421

[30] Foreign Application Priority Data

Dec. 24, 1968 Netherlands.........................6818589

[52] U.S. Cl..............................................106/120, 106/315
[51] Int. Cl. .........................................................C04b 1/00
[58] Field of Search..................................106/118–120, 314, 106/315

[56] References Cited

UNITED STATES PATENTS 3,100,526  8/1963  Martin.....................................106/315
3,501,323  3/1970  Moorehead............................106/118

*Primary Examiner*—James E. Poer
*Attorney*—Eugene J. Kalil

[57] ABSTRACT

The invention relates to a process of manufacturing hydrothermally cured structural elements from a mixture of slacked lime, unslacked lime, sand and water, to which is added one or more aliphatic polyhydroxy compounds having at least seven carbon atoms, preferably sodium 1,2,3,4,5,6-hexahydroxyhexane-1-carboxylate, or a derivative thereof, preferably a boron derivative, in a preferred small but effective amount of 0.01 to 0.1 percent by weight of total solids. The mixture is cast into moulds and the resulting structural elements removed therefrom after a short period of time, following which the elements are cured by treatment with steam in an autoclave.

7 Claims, No Drawings

PROCESS OF MANUFACTURING STRUCTURAL ELEMENTS

This invention relates to a process of manufacturing hydrothermally cured structural elements from a mixture of slacked lime, unslacked lime, silica-rich sand and water. Its main object is to incorporate in the starting mixture an additive permitting the mixture, after being cast into moulds, to be unloaded in the form of shaped articles within a short period, allowing the articles after unloading to be cured in the state as they are, and preventing the formation of cracks in the end product.

It is known to incorporate additives in hydraulic cement in order to improve its compression strength and to accelerate its curing process. Thus, German Pat. No. 1,099,427 proposes an addition of gluconic acid or sodium or calcium gluconate, together with salicylic acid or its alkali metal or alkaline earth metal salts and together with a chloride salt. However, such additives, taken alone or in combination, are unable to provoke sufficient acceleration of the curing process in articles made from a mixture of slacked lime, unslacked lime, sand and water, such articles being formed by casting the mixture into moulds and setting and curing the mixture by means of a steam treatment at 175° C. to 210° C. and 10 to 20 atmospheres.

In general, the manufacture of hydrothermally cured structural elements is effected by intimately mixing slacked lime with unslacked lime and sand, then adding water and working up the mixture to form a slurry. The water content of this slurry will be the main factor for defining the density of the resulting structural elements; thus a water content of 20 to 25 percent by weight (based on total solids) may result in elements having a density of 1.4 to 1.6 grams/cm³. Lower values of the water content will provide a slurry that cannot be cast anymore. After forming the slurry, it is cast into moulds and is set and cured in these moulds by treatment with steam in an autoclave. After proper curing, the moulds are removed and the resulting articles are dried. A disadvantage of this method of manufacture is that the moulds are repeatedly exposed to the influence of saturated steam, and thus are subject to rapid corrosion. Moreover, the aforesaid treatment in an autoclave generally lasts for several hours and the moulds are not available for other purposes during that period.

Quite surprisingly, it has now been found that these disadvantages may be prevented by incorporating one or more aliphatic polyhydroxy compounds having at least seven carbon atoms, or a derivative thereof, in the aforesaid mixture of slacked lime, unslacked lime, silica-rich sand and water. When this mixture is cast into moulds, it may be unloaded in the form of shaped articles in a much shorter time than before and the resulting articles may be cured in a steam atmosphere in the state as they are, thus preventing a direct influence of steam to moulds and a rapid corrosion of such moulds. Moreover, the articles or elements will show no cracks after curing.

The present invention provides for a process of manufacturing hydrothermally cured structural elements, comprising the steps of making a mixture of slacked lime, unslacked lime, silica-rich sand and water, together with a small but effective amount of 0.01 percent to 0.1 percent by weight, based on total solids, of at least one additive selected from the group of aliphatic polyhydroxy compounds having at least seven carbon atoms and derivatives thereof, casting the mixture into moulds, unloading the mixture in the form of structural elements from said moulds as soon as these elements have become sufficiently solid and curing said elements by treatment with steam under pressure. The preferred additives are sodium 1,2,3,4,5,6-hexahydroxyhexane-1-carboxylate and its complex boron derivative although many other polyhydroxy compounds are possible.

It has been found advantageous to add the aliphatic polyhydroxy compound(s) to the water that is used in making up the starting mixture. The resulting solution of polyhydroxy compound and water may then be continuously added to the other three components (slacked lime, unslacked lime and silica-rich sand) and the whole may be subjected to a blending treatment for obtaining an intimate mixture. This mixture may be cast into moulds, the moulds may be removed after some time (normally 30 minutes) and the resulting shaped articles may be subjected to a usual steam treatment at elevated temperatures and pressures in order to obtain the desired hydrothermally cured structural elements.

The advantages of the present invention will appear from the following example which comprises several comparative tests.

EXAMPLE.

Two separate mixtures were prepared, each from 20 kg. of ground sand, 60 kg. of river sand, 12 kg. of commercially available slacked lime and 8 kg. of ground unslacked lime. These components had the following analysis:

a. ground sand:
| | |
|---|---|
| > 0.09 mm. | 0.64 % |
| 0.063 to 0.09 mm. | 3.60 % |
| 0.032 to 0.063 mm. | 15.10 % |
| > 0.032 mm. | 80.64 % | b. river sand:
| | |
|---|---|
| > 3.15 mm. | 0.88 % |
| 2 to 3.15 mm. | 0.83 % |
| 1 to 2 mm. | 2.39 % |
| 0.5 to 1 mm. | 20.78 % |
| 0.2 to 0.5 mm. | 59.38 % |
| 0.1 to 0.2 mm. | 13.71 % |
| > 0.1 mm. | 2.03 % | c. slacked lime:
| | | | |
|---|---|---|---|
| CaO | 73.55 | $Mn_3O_4$ | 0.04 |
| MgO | 0.82 | $SO_3$ | 0.12 |
| $SiO_2$ | 0.26 | calcination residue | 24.82 |
| $Al_2O_3$ | 0.18 | $CO_2$ | 0.24 |
| $Fe_2O_3$ | 0.21 | $H_2O$ | 0.74 |

Sieve residue: 0.84 % did not pass through a sieve having meshes of 0.09 mm. width.

d. ground unslacked white lime:
| | | | |
|---|---|---|---|
| CaO | 94.78 | $Mn_3O_4$ | 0.07 |
| MgO | 1.19 | $SO_3$ | 0.15 |
| $SiO_2$ | 0.74 | calcination residue | 2.41 |
| $Al_2O_3$ | 0.37 | | |
| $Fe_2O_3$ | 0.29 | $CO_2$ | 1.47 |

NLK at $t_{60}$: 3.5 min. Sieve residue: 2.0 % did not pass through a sieve having meshes of 0.09 mm. width.

The first mixture (mixture 1) served as a control and 22 liters of water without any additive were continuously added to this mixture while stirring. On the other hand, 45 milliliters of 33 percent aqueous solution of sodium 1,2,3,4,5,6-hexahydroxyhexane-1-carboxylate (0.015 percent by weight, based on solids) were dissolved in another portion of 22 liters of water and the resulting dilute solution was added to the solid components of the other mixture (mixture 2) in the same way as the water to mixture 1. In both cases, thin castable masses were obtained and these masses were cast into moulds having dimensions of 50 × 50 × 12 cm. and allowed to set. The temperature changes of the masses in the moulds during a period of time are shown in Table 1 which has figures for an additive-containing mass and for a mass without additive.

TABLE 1

| Time (min.) | Temperature (°C.) with additive | without additive |
|---|---|---|
| 5 | 32.0 | 39.0 |
| 10 | 36.5 | 41.5 |
| 15 | 39.0 | 40.5 |
| 20 | 41.0 | 39.5 |
| 30 | 40.0 | 36.5 |
| 40 | 37.5 | 33.5 |

It appears from Table 1 that in masses without sodium 1,2,3,4,5,6-hexahydroxyhexane-1-carboxylate a maximum temperature is reached already at 10 minutes, whilst the addition of the aforesaid additive provokes a retardation of the slacking phenomenon and a shift of temperature maximum from 10 to 20 minutes.

The results of compression strength and bending strength measurements of the masses with and without additives are shown in Table 2.

TABLE 2

| Time | Bending strength (kg./cm.$^2$) | | Compression strength (kg./cm.$^2$) | |
| --- | --- | --- | --- | --- |
| (min.) | with add. | without add. | with add. | without add. |
| 30 | 0.8 | — | 2.0 | 0.8 |
| 40 | 0.8 | — | 2.1 | 1.0 |
| 50 | 0.9 | — | 2.5 | 1.2 |
| 60 | 1.2 | — | 2.9 | 1.5 |
| 70 | 1.3 | — | 3.0 | 1.6 |
| 80 | 1.4 | — | 3.2 | 1.8 |

Table 2 comprises average values of six measurements each time and shows clearly the advantages of the invention. At a compression strength of 2.0 kg./cm.$^2$, the resulting mass will generally be sufficiently stiff and solid to be unloaded from the mould. This degree of stiffness or solidness is reached already at 30 minutes in masses with an addition of polyhydroxy compound whereas it is not even reached after 80 minutes in masses without such an additive.

A number of tests with other slacking retarders has been carried out but with unsatisfactory results. Only the boron derivatives of the aforesaid polyhydroxy compounds show the same activity.

Sodium 1,2,3,4,5,6-hexahydroxyhexane-1-carboxylate is a compound which may exist in either of 32 steriochemical configurations. In practice, the commercially available α and β-isomers, i.e., D-gluco-D-guloheptonate and D-gluco-D-idoheptonate will be preferred. These isomers do not have substantial differences in chemical properties although said β-isomer dissolves slightly better in water than the other isomers.

The boron derivative of sodium 1,2,3,4,5,6-hexahydroxyhexane-1-carboxylate is essentially a mixture of sodium heptonate and a soluble boron compound forming a polyhydroxy-boron complex in aqueous solution. Said sodium heptonate as well as said sodium boron heptonate (its boron derivative) are prepared commercially and do not substantially contribute to the manufacturing costs of the structural elements.

In a practical test with mixtures prepared in accordance with the invention, these mixtures were cast into moulds and unloaded from their moulds without difficulties after 30 minutes. The resulting solid articles were subjected to a curing operation by means of steam. It took 1 hour to reach a temperature of 204° C. and a pressure of 16 atmospheres. The curing time was 4.5 hours and the blowing off period was 30 minutes, which corresponded to usual conditions in the lime sandstone art.

The resulting cured articles or structural elements sufficiently retained their shape and were free from cracks. Their compression strength (average value of 10 samples) was 583 kg./cm.$^2$ at a density of 1.56 grams/cm$^3$. It will be apparent to those skilled in the art that higher values of compression strength may be obtained by more extensive preparation of the starting materials, increasing the proportion of ground sand and the like.

What I claim is:

1. In the process of manufacturing hydrothermally cured structural elements, wherein a mixture of slacked lime, unslacked lime, silica-rich sand and water is formed into a slurry which is cast into a mould and then set and cured in the mould by treatment with high pressure steam in an autoclave, the improvement which comprises,
   adding to the mixture a small but effective amount of an additive consisting essentially of an aliphatic polyhydroxy compound containing at least seven carbon atoms, the amount being sufficient to cause said slurry to harden in the mould and provide sufficient strength to enable the unloading of the resulting element from said mould,
   unloading said structural element from the mould after it has become sufficiently hard,
   and then curing said structural element by treatment with steam under pressure.

2. The process of claim 1, wherein the aliphatic polyhydroxy compound is selected from the group consisting of sodium 1,2,3,4,5,6-hexahydroxyhexane-1-carboxylate and a boron complex of said sodium compound, the small but effective amount of said compound ranging from about 0.01 – 0.1 percent by weight of the mixture based on the total solids present.

3. The process of claim 1, wherein said compound is sodium 1,2,3,4,5,6-hexahydroxyhexane-1-carboxylate.

4. The process of claim 2, wherein said compound is added to the water employed in producing the mixture.

5. Hydrothermally cured structural elements formed from a mixture of slacked lime, unslacked lime, silica-rich sand and water containing a small but effective amount by weight of the total solids present of an additive consisting essentially of an aliphatic polyhydroxy compound containing at least seven carbon atoms.

6. The hydrothermally cured structural elements of claim 5, wherein the aliphatic polyhydroxy compound is selected from the group consisting of sodium 1,2,3,4,5,6-hexahydroxyhexane-1-carboxylate and a boron complex of said sodium compound in a small but effective amount ranging from about 0.01 to 0.1 percent by weight of the total solids present.

7. The hydrothermally cured structural elements of claim 5, wherein said compound is sodium 1,2,3,4,5,6-hexahydroxyhexane-carboxylate.

* * * * *